(12) United States Patent
Cao et al.

(10) Patent No.: US 8,842,067 B2
(45) Date of Patent: Sep. 23, 2014

(54) BACKLIGHT MODULE AND DISPLAY APPARATUS

(75) Inventors: Qian Cao, Shenzhen (CN); Yicheng Kuo, Shenzhen (CN); Kuojun Fang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 387 days.

(21) Appl. No.: 12/996,295

(22) PCT Filed: Aug. 23, 2010

(86) PCT No.: PCT/CN2010/076247
§ 371 (c)(1),
(2), (4) Date: Dec. 3, 2010

(87) PCT Pub. No.: WO2012/006800
PCT Pub. Date: Jan. 19, 2012

(65) Prior Publication Data
US 2012/0013527 A1  Jan. 19, 2012

(30) Foreign Application Priority Data
Jul. 14, 2010 (CN) .......................... 2010 1 0230786

(51) Int. Cl.
*G09G 3/36* (2006.01)
(52) U.S. Cl.
CPC ...................................... *G09G 3/36* (2013.01)
USPC .............................. 345/102; 349/65; 362/615
(58) Field of Classification Search
CPC .. G09G 3/3406; G02B 6/0023; G02B 6/0028; G02B 6/003; G02B 6/0031; G02B 6/033; G02B 6/0035; G02B 6/0036; G02B 6/004

USPC ................... 345/102; 349/61–65; 362/26, 27, 362/600–627
See application file for complete search history.

(56) References Cited

U.S. PATENT DOCUMENTS

| 5,453,855 | A |   | 9/1995 | Nakamura et al. |  |
|---|---|---|---|---|---|
| 5,961,198 | A | * | 10/1999 | Hira et al. | 362/621 |
| 2003/0202363 | A1 |   | 10/2003 | Adachi et al. |  |
| 2010/0135041 | A1 | * | 6/2010 | Niu | 362/627 |

FOREIGN PATENT DOCUMENTS

| CN | 2594828 | Y | 12/2003 |
| CN | 1506729 | A | 6/2004 |
| CN | 1550800 | A | 12/2004 |
| CN | 101101349 | A | 8/2009 |
| CN | 101943357 | A | 1/2011 |
| JP | 2001228477 | A | 8/2001 |

\* cited by examiner

*Primary Examiner* — Regina Liang
(74) *Attorney, Agent, or Firm* — Sughrue Mion, PLLC

(57) ABSTRACT

The present invention provides a backlight module and a display apparatus. The display apparatus comprises a backlight module and a display panel. The backlight module comprises a light guide plate and a plurality of light sources. The light guide plate has a bottom surface. The bottom surface is formed with a middle trench. The middle trench comprises dimming cants. The light sources are positioned at two opposite sides of the light guide plate in accordance with the dimming cants. The present invention can adjust a light intensity distribution and promote the central brightness of the screen.

10 Claims, 5 Drawing Sheets

BACKLIGHT MODULE AND DISPLAY APPARATUS

BACKGROUND OF THE INVENTION

1. Field of the Invention

The present invention generally relates to a backlight module and a display apparatus and more particularly to a backlight module and a display apparatus capable of adjusting a light intensity distribution and promoting the central brightness of the screen.

2. Description of Prior Art

Liquid crystal display (LCD) is widely used in kinds of electronic products. Most of the Liquid crystal displays are backlight type LCDs, which comprises a display panel and a backlight module. The backlight modules can be categorized into a side lighting type and a direct light type to provide backlight to the liquid crystal display panel according to the different light source positions.

Generally, the central brightness is an important parameter for a liquid crystal display. Generally, promotion of the central brightness of the liquid crystal display can be achieved by raising the light intensity of the back light source (for example, light emitting diode) in the backlight module. However, such achievement easily requires increase of the power consumption and needs unnecessary energy waste.

Consequently, there is a need to provide a backlight module and a display apparatus for solving the drawbacks of prior arts.

SUMMARY OF THE INVENTION

An objective of the present invention is to provide a backlight module. The backlight module comprises:
a light guide plate, having a bottom surface formed with a middle trench, and the middle trench comprises two dimming cants, a predetermined angle is formed between each of the dimming cants and the bottom surface and larger than 90 degrees; and
a plurality of light sources, positioned at two opposite sides of the light guide plate in accordance with the dimming cants.

Another objective of the present invention is to provide a display apparatus. The display apparatus comprises:
a display panel; and
a backlight module, comprising:
a light guide plate, having a bottom surface formed with a middle trench, and the middle trench comprises two dimming cants, a predetermined angle is formed between each of the dimming cants and the bottom surface and larger than 90 degrees; and
a plurality of light sources, positioned at two opposite sides of the light guide plate in accordance with the dimming cants.

In one embodiment, micro structures are formed on the bottom surface of the light guide plate. In one embodiment, the dimming cants are tilted planes. In one embodiment, the dimming cants are tilted curved surfaces.

In one embodiment, a light intensity distribution of the light guide plate is adjusted according to a distance between the top end and an out light surface of the middle trench, an open width of the middle trench and a curved surface shapes of the dimming cants.

In one embodiment, a light intensity distribution of the light guide plate is adjusted according to a top angle of the middle trench, a distance between the top end and an out light surface of the middle trench, and a height between the bottom surface and a reflection layer of the light guide plate.

In one embodiment, a sectional shape of the middle trench is a triangle. In one embodiment, micro structures are formed on the dimming cants of the middle trench. In one embodiment, a sectional shape of the middle trench is a ladder shape.

In one embodiment, a light intensity distribution of the light guide plate is adjusted according to the predetermined angle, a distance between the top end and an out light surface of the middle trench, a height between the bottom surface and a reflection layer of the light guide plate and bottom width of the ladder shape of the middle trench.

The backlight module and the display apparatus of the present invention can adjust the light intensity distribution to promote the backlight effect of the backlight module and display quality of the display apparatus. The light intensity distribution of the light guide plate (i.e. brightness distribution of the backlight module) can be easily controlled or adjusted by adjusting the related parameters of the middle trench. For example, the backlight module and the display apparatus of the present invention can utilize the designs of the middle trench to promote the central brightness of the screen without extra output power. Namely, the present invention can cut unnecessary power consumption and save energy. Beside, the micro structures can be formed on the surface of the middle trench in further to promote the brightness distribution of the backlight module and the display apparatus.

For a better understanding the aforementioned content of the present invention, preferable embodiments are illustrated in accordance with the attached figures for further explanation:

DETAILED DESCRIPTION OF THE INVENTION

Figure 1:
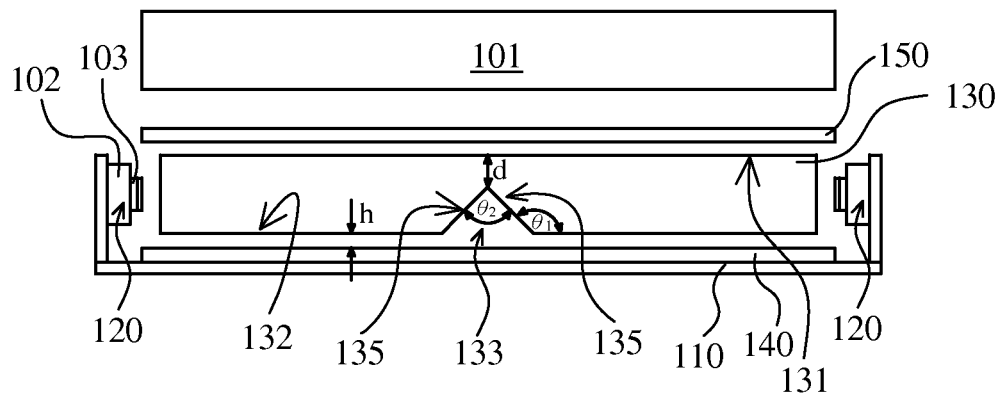
FIG. 1 shows a sectional diagram of a backlight module and a display apparatus according to the first embodiment of the present invention.

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In figures, the elements with similar structures are indicated by the same number. Please refer to FIG. 1, which shows a sectional diagram of a backlight module and a display apparatus according to the first embodiment of the present invention. The backlight module 100 of the present invention can be a side lighting backlight module as illustration and installed for a display panel 101 (for example a liquid crystal display panel) for assemble a display apparatus (for example a liquid crystal display apparatus). The backlight module 100 comprises a back plate 110, a plurality of light sources 120, a light guide plate 130, a reflection layer 140 and an optical film 150. The back plate 110 is employed for installing the light sources 120, the light guide plate 130, the reflection layer 140 and the optical film 150. The light sources 120 is installed at the opposite two sides of the light guide plate 130 to laterally emitting light toward the interior of the light guide plate 130. The light guide plate 130 guides the out light. The reflection layer 140 is installed at the bottom of the light guide plate 130. The optical film 150 is installed above the light guide plate 140 for promoting the optical effect.

As shown in FIG. 1, the back plate 110 is made by non transparent material, for example, plastic material, metal material or the combination thereof. The light sources 120, for example, can be cold cathode fluorescent Lamps (CCFL), light emitting diodes (LED), organic light emitting diodes (OLED), electro-luminescences (EL), light bars or the combinations thereof.

As shown in FIG. 1, in this embodiment, the light sources 120, for example, can be light bars comprising circuit boards 102 and a plurality of light-emitting components 103 (For example, LED chips). The circuit boards 102, for example, can be printed circuit boards (PCB) or flexible printed circuits (FPC). The light-emitting components 103 are installed on the circuit boards 102.

As shown in FIG. 1, the light guide plate 130 of the embodiment, for example, can be manufactured by injection mold. For example, the material can be photocurable resin, Polymethylmethacrylate (PMMA), or Polycarbonate (PC). The light guide plate 130 is installed between the light sources 120 for providing the backlight for the display panel 101.

Figure 2:
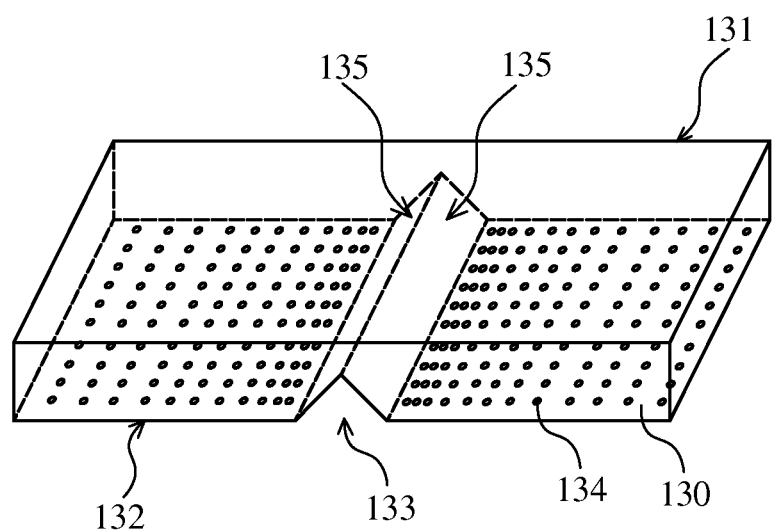
FIG. 2 shows a diagram of a light guide plate according to the first embodiment of the present invention.

Please refer to FIG. 1 and FIG. 2. FIG. 2 shows a diagram of a light guide plate according to the first embodiment of the present invention. The light guide plate 130 of this embodiment comprises an out light surface 131, a bottom surface 132 and a middle trench 133. The out light surface 131 is formed as one side of the light guide plate 130 and facing the display panel 101. The out light surface 131 can be matt finished or scattering pod designed (not shown) to equalize the out light of the light guide plate 130 for reducing phenomenon of mura. In on embodiment, a plurality of extruding structures also can be formed on the out light surface 131 for correcting the direction of light in advance, promoting focus effect and promoting the front brightness. The extruding structures, for example, can be rhombic or semicircular. The bottom surface 132 is formed as being the other side of the light guide plate 130. In this embodiment, the light guide plate 130 can be a plane shaped structure. Meanwhile, micro structures 134 can be formed on the bottom surface 132 for guiding the light form the out light surface 131. For example, the micro structures 134 can be continuous V shaped structures, i.e. V-cut structures (For example formed by injection mold or micromachining), matt finished structures (for example, formed by sandblast process) or scattering pod structures (for example formed by screen print, laser fine machining or one-body shape) for guiding light emitted into the light guide plate 130 fully to be emitted out of the out light surface 131. Moreover, the distribution of the micro structures 134 is increased outside in but not formed inside the middle trench 133.

As shown in FIG. 1 and FIG. 2, the middle trench 133 of the light guide plate 130 in this embodiment is formed at the middle of the light guide plate 130 and indented on the bottom surface 132. The middle trench 133 comprises two dimming cants 135. The dimming cants 135 can be titled planes or tilted curved surfaces formed at two sides of the middle trench 133 in accordance with the light sources 120 to adjust the directions and the distribution of the light from the light sources 120. A predetermined angle $\theta 1$ is formed between each of the dimming cants 135 and the adjacent bottom surface 132. The angle $\theta 1$ is larger than 90 degrees and preferably between 100 degrees and 170 degrees, for example, 135 degrees. In this embodiment, a sectional shape of the middle trench 133 is a triangle. Therefore, the dimming cants 135 can be tilted planes formed at two sides of the middle trench 133. In such case, a top angle $\theta 2$ of the middle trench 133 is formed between the two dimming cants 135 (predetermined according to the angle $\theta 1$). A distance d is formed between the top end of the middle trench 133 and the out light surface 131. A height h is formed between the bottom surface 132 of the light guide plate 130 and the reflection layer 140. When the light guide plate 130 is employed for guiding the light of the light sources 120, the aforesaid parameters $\theta 2$, d and h can be adjusted to control the light intensity distribution of the out light of the light guide plate 130.

As shown in FIG. 1, the reflection layer 140, for example a reflection film or reflection coated layer with high reflectivity material to reflect the light emitted through the bottom surface 132 of the light guide plate 130. For example, the high reflectivity material can be Argentum, Aluminium, Aurum, Chromium, Copper, Indium, Iridium, Niccolum, Platinum, Rhenium, Rhodium, Stannum, Tantalum, Wolfram, Cobaltum, the alloy of the aforesaid materials, white reflection paint of yellowing resistance, heat resisting, or any combination of the aforesaid materials to reflect light.

As shown in FIG. 1, the optical film 150, for example, can be a diffusion sheet, a prism sheet, a turning prism sheet, a brightness enhancement film (BEF), dual brightness enhancement film (DBEF), diffused reflective polarizer film (DRPF), or the combinations thereof. The optical film 150 is positioned above the out light surface 131 of the light guide plate 130 to promote the optical effect of the out light of the light guide plate 130.

When the backlight module 100 provides the backlight for the display panel 101, the light sources 120 at the two opposite sides of the light guide plate 130 can emit light to the light guide plate 130 and the light guide plate 130 guides the light of the light sources 120 to the display panel 101. At this moment, the light intensity distribution of the light guide plate 130 can be adjusted by the middle trench 133 to achieve expected effect and brightness. For example, the dimming cants 135 of the middle trench 133 of the light guide plate 130 can reflect the light of the light sources 120 accordingly to the out light surface 131 to promote the out light brightness at the central area of the light guide plate 130, i.e. to promote the brightness at the central area of the backlight module 100 and the display apparatus employing thereof. Furthermore, the light intensity distribution of the light guide plate 130 can be arbitrarily controlled by adjusting the related parameters $\theta 2$, d and h.

Accordingly, the backlight module 100 and the display apparatus employing thereof in this embodiment can utilize the middle trench 133 of the light guide plate 130 to adjust the light intensity distribution accordingly to promote the backlight effect of the backlight module 100 and the display quality of the display apparatus.

Figure 3:
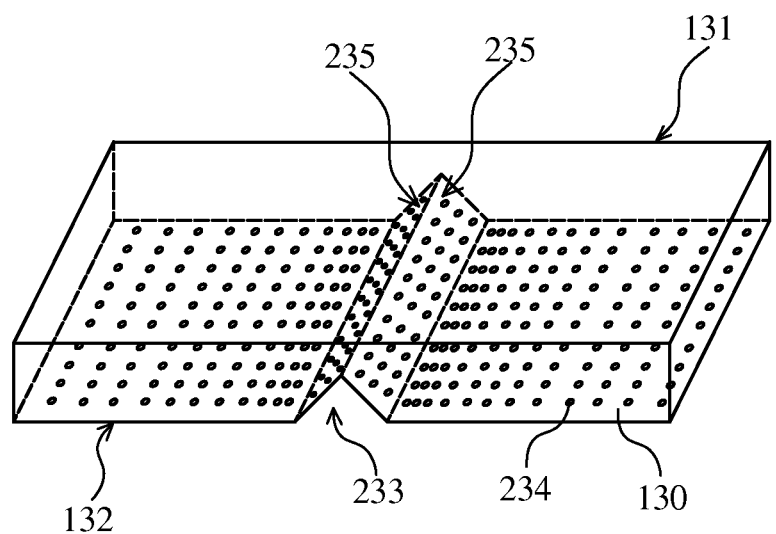
FIG. 3 shows a diagram of a light guide plate according to the second embodiment of the present invention.

Please refer to FIG. 3, which shows a diagram of a light guide plate according to the second embodiment of the present invention. Below will be descriptions for the differences from the first embodiment. Other similar portions will be omitted. Comparing with the first embodiment, micro structures 234 can be formed on dimming cants 235 of a middle trench 233, i.e. the micro structures 234 can be formed on the bottom surface 132 and the dimming cants 235 of the light guide plate 130 to further promote the light intensity distribution of the backlight module 100. For example, the micro structures 234 can be continuous V shaped structures, matt finished structures or scattering pod structures. Moreover, the distribution of the micro structures 234 is increased outside in (from the two sides of the light guide plate 130 toward the middle trench 233).

Figure 4A:
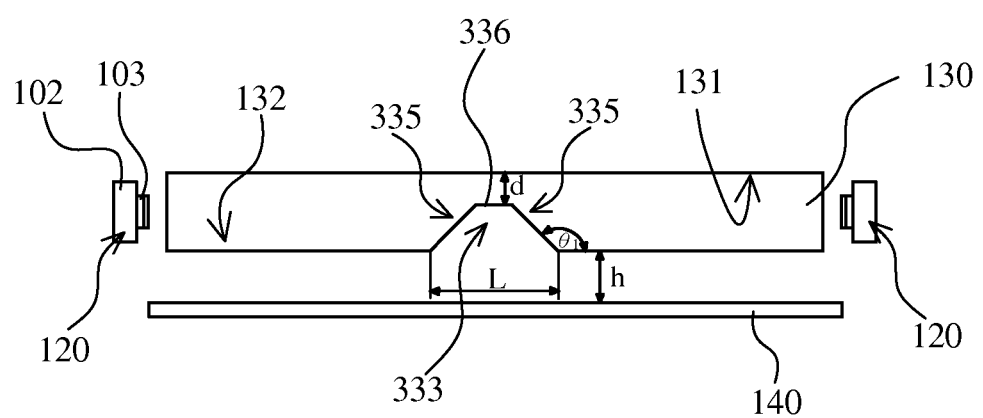
FIG. 4A shows a sectional diagram of a backlight module according to the third embodiment of the present invention.
Figure 4B:
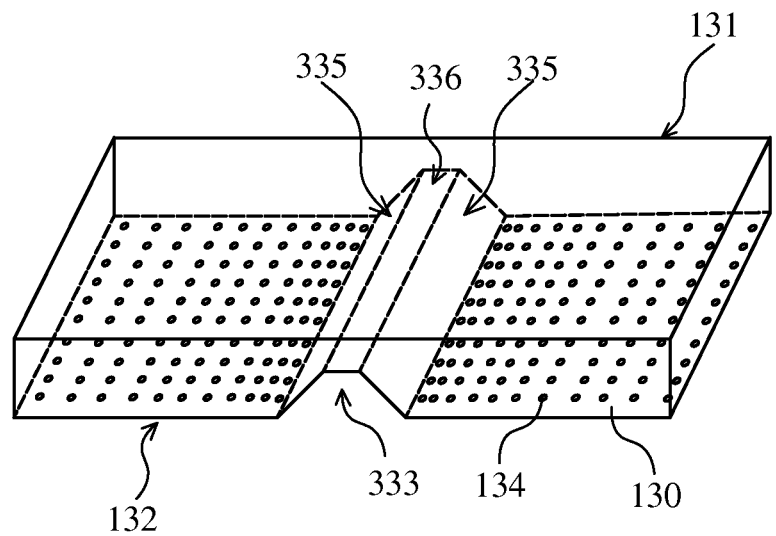
FIG. 4B shows a diagram of a light guide plate according to the third embodiment of the present invention.

Please refer to FIG. 4A and FIG. 4B. FIG. 4A shows a sectional diagram of a backlight module according to the third embodiment of the present invention. FIG. 4B shows a diagram of a light guide plate according to the third embodiment of the present invention. Below will be descriptions for the differences from the first embodiment. Other similar portions will be omitted. Comparing with the first embodiment, a sectional shape of the middle trench 333, for example, can be a ladder shape. The middle trench 333 comprises dimming cants 335 and a top end surface 336. The dimming cants 335 can be tilted surfaces formed at two opposite sides of the top end surface 336. Meanwhile, a predetermined angle $\theta 1$ is formed between the dimming cants 335 and the bottom surface 132. A distance d is formed between the top end surface 336 of the middle trench 333 and the out light surface 131. A height h is formed between the bottom surface 132 of the light guide plate 130 and the reflection layer 140. L represents the bottom width (i.e. the open width of the middle trench) of the ladder shape of the middle trench 333. Therefore, as the light guide plate 130 is employed for guiding the light of the light sources 120, the light intensity distribution of the light guide plate 130 can be controlled by adjusting the related parameters $\theta 1$, d, h and L.

Figure 5:
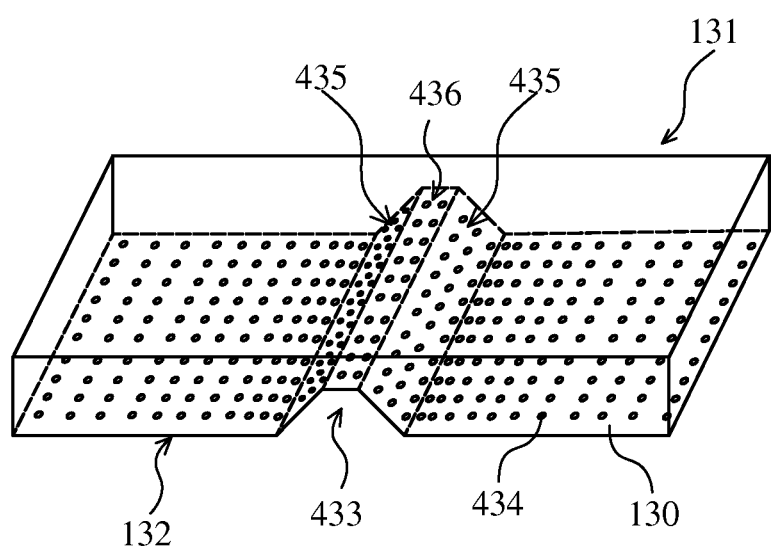
FIG. 5 shows a diagram of a light guide plate according to the fourth embodiment of the present invention.

Please refer to FIG. 5, which shows a diagram of a light guide plate according to the fourth embodiment of the present invention. Below will be descriptions for the differences from the first embodiment. Other similar portions will be omitted. Comparing with the first embodiment, the sectional shape of the middle trench 433 of the fourth embodiment, for example, can be a ladder shape. The middle trench 433 comprises dimming cants 435 and a top end surface 436. The dimming cants 435 can be tilted surfaces formed at two opposite sides of the top end surface 436. Meanwhile, micro structures 434 can be formed on the dimming cants 435 and the top end surface 436 of the middle trench 433, i.e. the micro structures 434 can be formed on the bottom surface 132 of the light guide plate 130, the dimming cants 435 and the top end surface 436 to further promote the light intensity distribution of the backlight module 100. The micro structures 434 can be continuous V shaped structures, matt finished structures or scattering pod structures. Moreover, the distribution of the micro structures 434 is increased outside in (from the two sides of the light guide plate 130 toward the middle trench 433).

Figure 6A:
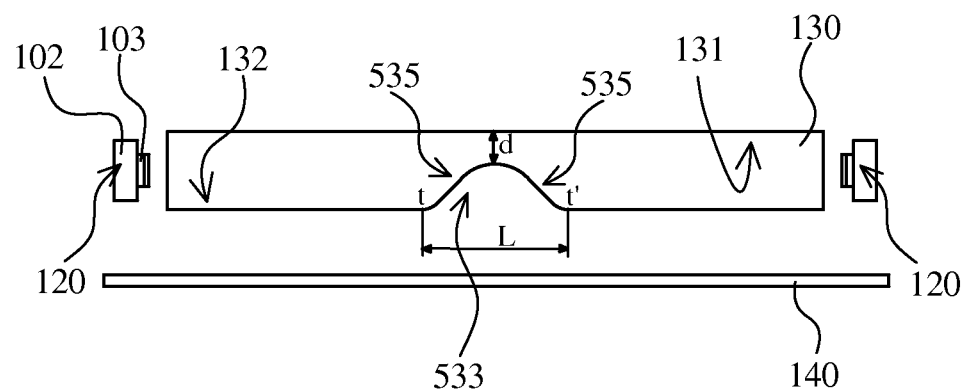
FIG. 6A shows a sectional diagram of a backlight module according to the fifth embodiment of the present invention.
Figure 6B:
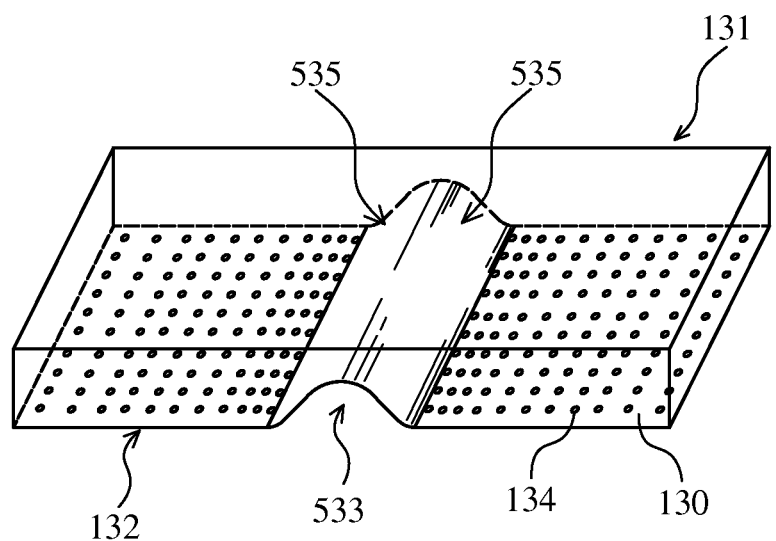
FIG. 6B shows a diagram of a light guide plate according to the fifth embodiment of the present invention.

Please refer to FIG. 6A and FIG. 6B. FIG. 6A shows a sectional diagram of a backlight module according to the fifth embodiment of the present invention. FIG. 6B shows a diagram of a light guide plate according to the fifth embodiment of the present invention. Below will be descriptions for the differences from the first embodiment. Other similar portions will be omitted. Comparing with the first embodiment, dimming cants 535 of the middle trench 533 in the fifth embodiment can be curved surfaces formed at two opposite sides of the middle trench 533 and tangent with the bottom surface 132 at two points t and t'. Meanwhile, a distance L exists between the two points t and t' (i.e. the open width of the middle trench). A distance d is formed between the top of the middle trench 533 and the out light surface 131. Therefore, as the light guide plate 130 is employed for guiding the light of the light sources 120, the light intensity distribution of the light guide plate 130 can be controlled by adjusting the related parameters d, L and the curved surface shape of the dimming cants 535.

Figure 7:
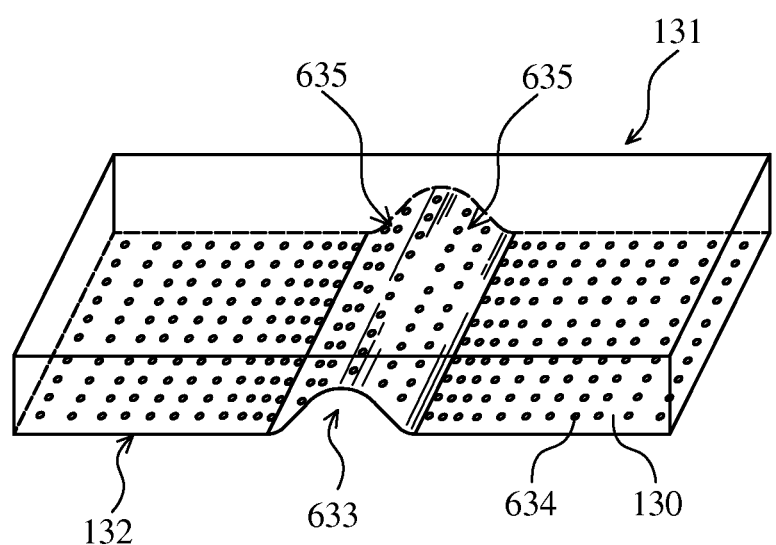
FIG. 7 shows a diagram of a light guide plate according to the sixth embodiment of the present invention.

Please refer to FIG. 7, which shows a diagram of a light guide plate according to the sixth embodiment of the present invention. Below will be descriptions for the differences from the first embodiment. Other similar portions will be omitted. Comparing with the first embodiment, dimming cants 635 of the middle trench 633 in the fifth embodiment can be curved surfaces and micro structures 634 are formed thereon, i.e. the micro structures 634 can be formed on the bottom surface 132 of the light guide plate 130 and the dimming cants 635 to further promote the light intensity distribution of the backlight module 100. The micro structures 634 can be continuous V shaped structures, matt finished structures or scattering pod structures. Moreover, the distribution of the micro structures 634 is increased outside in (from the two sides of the light guide plate 130 toward the middle trench 633).

As aforementioned, the backlight module and the display apparatus of the present invention can utilize the middle trench of the light guide plate to adjust the light intensity distribution accordingly to promote the backlight effect of the backlight module and the display quality of the display apparatus. The middle trench of the light guide plate can have arbitrary sectional shape, for example, a triangle, a ladder shape or a polygon. The light intensity distribution of the light guide plate can be controlled or adjusted by adjusting the related parameters of the middle trench. For example, the backlight module and the display apparatus of the present invention can utilize the design of the middle trench to promote the central brightness of the screen without extra output power. Therefore, in comparison with the method of increasing the central brightness according to prior art, the present invention can cut unnecessary power consumption and save energy. Furthermore, micro structures can be formed on the surface of the middle trench of the light guide plate of the backlight module for promote the light intensity distribution of the backlight module and the display apparatus employing thereof.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A display apparatus, characterized in that the display apparatus comprises:
   a display panel; and
   a backlight module, comprising:
      a light guide plate, having a bottom surface formed with only one single middle trench, and the middle trench comprises two dimming cants, a predetermined angle is formed between each of the dimming cants and the bottom surface and larger than 90 degrees, wherein the single middle trench is an elongated trench positioned at the middle of the bottom surface for promoting an out light brightness at the central area of the light guide plate; and a plurality of light sources, positioned at two opposite sides of the light guide plate in accordance with the dimming cants, wherein a light intensity distribution of the light guide plate is adjusted according to a top angle of the middle trench, a distance between a top end of the middle trench and an out light surface of the light guide plate, and a height between the bottom surface and a reflection layer of the light guide plate;

wherein micro structures are formed on the bottom surface of the light guide plate and the dimming cants of the middle trench, and a distance between a top end of the middle trench and bottom surface is larger than a height of each of the micro structures.

2. A display apparatus, characterized in that the display apparatus comprises:

a display panel; and a backlight module, comprising:

a light guide plate, having a bottom surface formed with only one single middle trench, and the middle trench comprises two dimming cants, a predetermined angle is formed between each of the dimming cants and the bottom surface and larger than 90 degrees, wherein the single middle trench is an elongated trench positioned at the middle of the bottom surface for promoting an out light brightness at the central area of the light guide plate; and a plurality of light source, positioned at two opposite sides of the light guide plate in accordance with the dimming cants;

wherein micro structures are formed on the bottom surface of the light guide plate and the dimming cants of the middle trench, and a distance between a top end of the middle trench and bottom surface is larger than a height of each of the micro structures.

3. A backlight module, characterized in that the backlight module comprises:

a light guide plate, having a bottom surface formed with only one single middle trench, and the middle trench comprises two dimming cants, a predetermined angle is formed between each of the dimming cants and the bottom surface and larger than 90 degrees, wherein the single middle trench is an elongated trench positioned at the middle of the bottom surface for promoting an out light brightness at the central area of the light guide plate; and a plurality of light sources, positioned at the two opposite sides of the light guide plate in accordance with the dimming cants;

wherein micro structures are formed on the bottom surface of the light guide plate and the dimming cants of the middle trench, and a distance between a top end of the middle trench and bottom surface is larger than a height of each of the micro structures.

4. The backlight module of claim 3, characterized in that the dimming cants are tilted planes.

5. The backlight module of claim 3, characterized in that the dimming cants are tilted curved surfaces.

6. The backlight module of claim 5, characterized in that a light intensity distribution of the light guide plate is adjusted according to a distance between the top end and an out light surface of the middle trench, an open width of the middle trench and a curved surface shapes of the dimming cants.

7. The backlight module of claim 3, characterized in that a light intensity distribution of the light guide plate is adjusted according to a top angle of the middle trench, a distance between the top end and an out light surface of the middle trench, and a height between the bottom surface and a reflection layer of the light guide plate.

8. The backlight module of claim 3, characterized in that a sectional shape of the middle trench is a triangle.

9. The backlight module of claim 3, characterized in that a sectional shape of the middle trench is a ladder shape.

10. The backlight module of claim 9, characterized in that a light intensity distribution of the light guide plate is adjusted according to the predetermined angle, a distance between the top end and an out light surface of the middle trench, a height between the bottom surface and a reflection layer of the light guide plate and bottom width of the ladder shape of the middle trench.

* * * * *